Patented Aug. 20, 1946

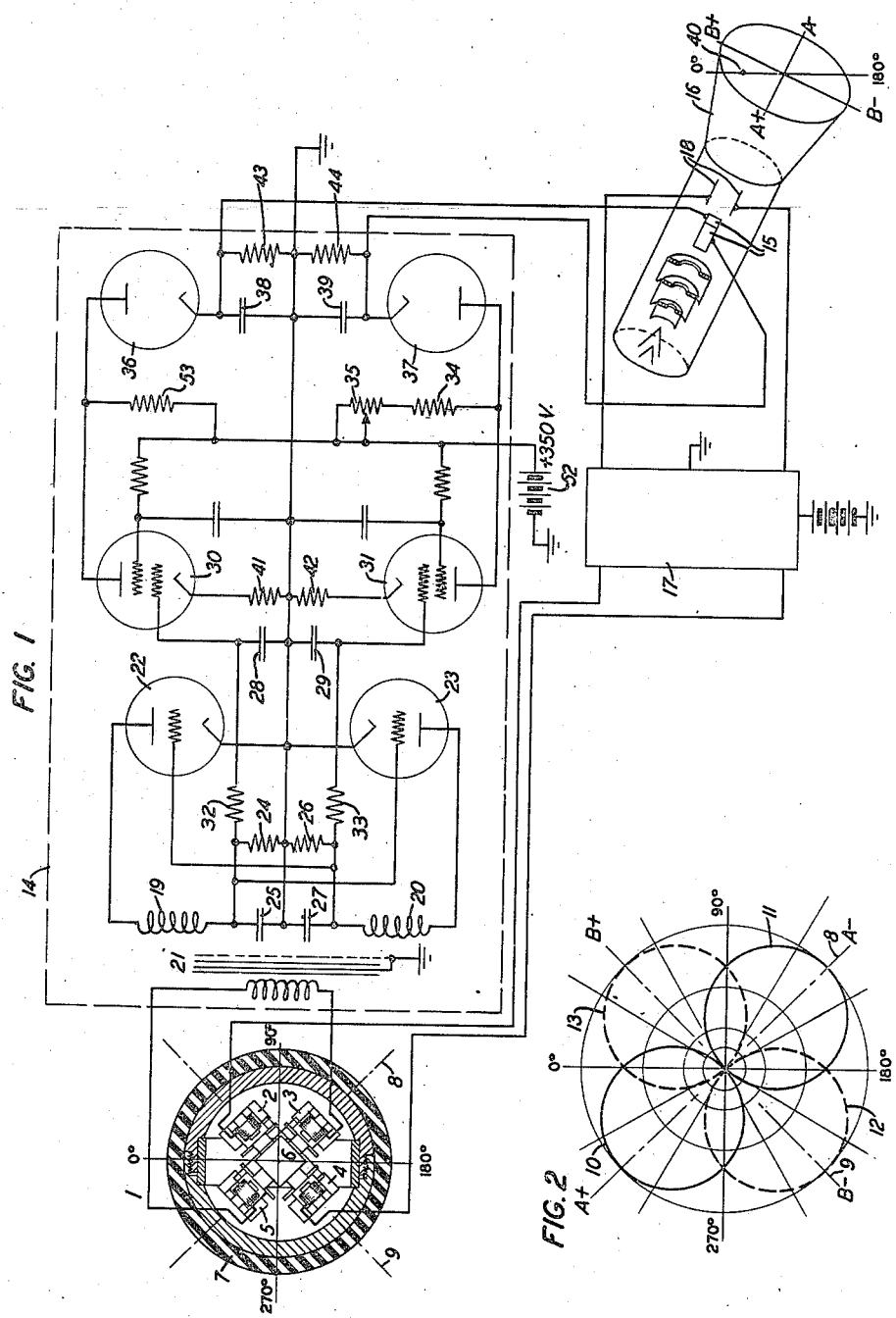

2,406,014

UNITED STATES PATENT OFFICE 2,406,014

SYSTEM FOR LOCATING THE SOURCE OF AN EXPLOSION WAVE

William R. Harry, Summit, N. J., assignor to Bell Telephone Laboratories, Incorporated, New York, N. Y., a corporation of Delaware Application December 28, 1943, Serial No. 515,889

7 Claims. (Cl. 177—352)

This invention relates to the location of the point of origin of an explosion wave in accordance with the general method disclosed in the copending application of W. D. Goodale et al., Serial No. 515,886 filed December 28, 1943.

In the Goodale et al. application advantage is taken of the asymmetric nature of an explosion wave to obtain an indication of the direction of and the distance to the origin of the wave by the use of two directional microphones of the cosine type mounted on a common support with their axes of sensitivity in quadrature and respectively connected to the two pairs of deflecting plates of a cathode ray oscilloscope.

The object of this invention is to improve the visual indication produced by such a system.

While the system of the Goodale et al. application responds to the initial positive pressure pulse of the wave to give an indication of the angle of incidence, it is found in practice that the succeeding negative pulse, which is of smaller amplitude but of longer duration, follows the initial pulse so closely in time as to obscure the initial indication.

According to this invention there is interposed in the circuits between each pick-up unit and the oscilloscope means whereby a current of either polarity produced by the initial pressure pulse temporarily disables the circuit so that it cannot respond to the succeeding negative pulse.

The visual indication is further improved according to the invention by means of suitable pulse lengthening networks which cause the very short initial pulses to be effective in the deflecting circuits of the oscilloscope for a time interval long enough for proper observation.

These and other features of the invention are set forth in more detail in the following description and the drawing in which Fig. 1 is a schematic circuit of the preferred form of applicant's system and Fig. 2 is a polar diagram of the directional characteristic of the pick-up units.

In Fig. 1 the pick-up 1 may be of the type more fully disclosed in my copending application Serial No. 494,640, filed July 14, 1943, and comprising essentially four electromagnetic, inertia-type units 2, 3, 4 and 5 of the general construction disclosed in Patent 2,202,906, granted to Hawley, June 4, 1940. These units are mounted on the four faces of a square supporting bar 6 within a spherical shell 7 with the oppositely disposed units in axial alignment and the axes 8 and 9 of the pairs of units intersecting at the center of the shell.

Each of the units 3 and 5 has a double lobed directional pick-up characteristic as shown by the full line curves 10, 11 of Fig. 2 and similarly each of the units 2 and 4 has a characteristic as shown by the dotted curves 12, 13 so that the required pick-up pattern may be obtained by only two of the units, such, for example, as 2 and 5. However, the four-unit structure shown is preferred because of its symmetry and by connecting the opposed units of each pair together in series-aiding relationship, the device becomes in effect a two-unit structure.

The units 3 and 5 are connected through a suitable detecting and pulse lengthening circuit 14 to the corresponding pair of plates 15, 15 of the oscilloscope tube 16 and the units 2 and 4 are connected through a similar circuit 17 to the plates 18, 18. The tube 16 is conventional and is preferably oriented with respect to the pick-up 1 so that the observed deflections of the beam from its central position will be in the direction of the wave source.

As explained in more detail in the Goodale et al. application, an explosion wave arriving at the pick-up with any angle of incidence within the upper and lower quadrants defined by the axes 8 and 9 of Fig. 2 will cause the two pairs of units to generate voltages of the same polarity, but for the upper quadrant these voltages will be of one polarity, e. g., positive, while in the lower quadrant they will be of the opposite polarity, or negative. On the other hand, waves with angles of incidence within either lateral quadrant will produce two voltages of opposite polarities, those from the 90-degree quadrant producing negative voltages in the A channel and positive voltages in the B channel and those from the 270-degree quadrant producing positive voltages in the A channel and negative voltages in the B channel.

As indicated by the response curves 10 to 13, the relative magnitudes of the voltages generated will vary with the angle of incidence within any quadrant so that, taking into account both the polarities and magnitudes, there will be generated a different pair of voltage values for each different angle of the wave source from the pick-up point.

A voltage generated by the units 3 and 5 due to the first pulse of an explosion wave will induce voltages in the secondary windings 19 and 20 of the input transformer 21 but since the circuits associated with these windings each include a rectifier 22 or 23 there will be current in only one of these circuits depending on the electrical polarity of the pulse.

If, for example, the pulse is such that the plate of rectifier 22 is positive with respect to the plate of rectifier 23, the latter will be non-conducting but there will be a current through the winding 19, the rectifier 22 and the parallel combination of resistor 24 and condenser 25. Similarly for a pulse of opposite electrical polarity rectifier 22 will be non-conducting but there will be a current through winding 20, the rectifier 23 and the parallel combination of resistor 26 and condenser 27.

These circuits constitute a full-wave peak detector designed to charge the condenser 25 (or 27) to a voltage proportional to the amplitude of the first pulse.

Since the grid resistors 24 and 26 are directly in shunt to the condensers 25 and 27, respectively, they are made as large in value as the stability of the tubes permits so as to avoid too rapid loss of condenser voltage. When either condenser is charged by the first pulse of the wave the condenser voltage becomes a high negative bias on the grid of the other rectifier tube which blocks it for a time at least long enough to exclude the succeeding pulse of opposite polarity.

In practice the voltage at the grids of the tubes 22 and 23 may be of the order of 75 volts and the condensers 25 and 27 are of very small capacity, such as .00037 microfarad, so that they will become fully charged, but since the stability requirements of the tubes limit the resistors 24 and 26 to about 10 megohms, this charge is dissipated in a time which is much too short for the proper observation of an oscilloscope deflection. These charges are therefore transferred to larger condensers 28 and 29 in the input circuits of the tubes 30 and 31 through resistors 32 and 33 of about 5 megohms in order to give a large increase in the time constant.

It will be understood that for accurate results the amplifying tubes 30 and 31 must be well matched and must give a linear output over the working range of voltages to be applied to the condensers 28 and 29. It is therefore advantageous to stabilize the operation of these tubes with negative feedback which in the circuit shown is obtained by proper choice of the cathode resistors 41 and 42.

Plate current is supplied to the tubes 30 and 31 from a source 52 through resistors 53 and 34, respectively. The plate circuit of one of the tubes also includes a variable resistor, such as 35, for accurately equalizing these plate currents. The resistors 53, 34 and 35 also carry current for the diodes 36 and 37 so that in the absence of signals the condensers 38 and 39 are charged to equal potentials. The plates 15, 15 of the oscilloscope 16 are therefore normally at equal positive potentials to maintain the beam in its midposition between them.

When a charge is transferred to one of the condensers 28 or 29 this additional negative bias on the associated tube, such as 30, reduces the plate current thereby reducing the potential drop in the resistor 53 and increasing the potential applied to the plate of the diode 36. The condenser 38 is therefore suddenly charged to a higher potential than condenser 39 and the beam tends to deflect downwardly along the A axis as shown in Fig. 2. Conversely, if the polarity of the pulse is of opposite sign so that condensers 27 and 29 are charged, tube 31 will be cut off thereby causing condenser 39 to be charged to a higher potential than condenser 38 so that the beam tends to deflect upwardly along the A axis. The condensers 38 and 39 are in turn of much larger capacity than the condensers 28 and 29 and the discharge resistors 43 and 44 are of the order of at least 10 megohms which causes these networks to lengthen further the pulses originally applied to the condensers 25 and 27.

Except in the case of an explosion directly on the A axis one of the condensers in the similar circuit 17 associated with the pick-up units 2 and 4 will also be charged by the initial pulse thereby momentarily raising the potential of one of the oscilloscope plates 18. This unbalance of the potentials of the plate 18 will tend to deflect the beam along the B axis in a direction depending on whether the pulse is received from the B+ or the B− direction of Fig. 2.

In any case, the actual deflection of the beam will be proportional to the resultant of the two unbalance potentials in the outputs of the circuits 14 and 17. If, for example, the origin of the wave is at 0 degrees with respect to the pick-up 1, then the unbalance voltages are equal and each tends to deflect the beam into the corresponding positive quadrant so that the oscilloscope spot will show a deflection to a point such as 40 which, by its angular position and radial displacement, indicates both the direction of and the distance to the point of the explosion. Due to the suppression of the second pulse of the wave this indication will be relatively free from extraneous information and by proper choice of circuit constants the voltage pulse at the oscilloscope plates may be of the order of several seconds which is several thousand times the duration of the initial pressure pulse of the wave so that the operator may observe the azimuth and range of the point of origin of the explosion with much greater accuracy.

What is claimed is:

1. In a system for locating the source of an explosion wave, the combination with two directional microphones of the cosine type having their axes of sensitivity disposed in quadrature and apparatus for producing an indication in accordance with the magnitudes and polarities of the outputs of the microphones, of two rectifiers selectively energized according to the polarity of the first pulse of a wave acting on the microphones and cross-connections between the rectifiers whereby a current pulse through either rectifier momentarily blocks the other rectifier for preventing the apparatus from responding to the succeeding pulse of opposite polarity, the outputs of said rectifiers being connected to said indicating apparatus.

2. In a system for locating the source of an explosion wave, the combination with two directional microphones of the cosine type having their axes of sensitivity disposed in quadrature, apparatus for producing an indication in accordance with the magnitudes and polarities of the outputs of the microphones and a separate circuit connecting each microphone to the apparatus, of two condensers in each circuit, charging circuits for selectively charging the condensers of each circuit according to the polarity of the voltage generated by the microphone of that circuit in response to the first pulse of an explosion wave, and means controlled by the charged condenser in each circuit for preventing the other condenser from being charged by a succeeding pulse of the wave.

3. In a system for locating the source of an explosion wave, the combination with a directional microphone an indicating device and a transmission path connecting the microphone with the device, of two condensers, circuits for selectively charging the condensers in accordance with the electrical polarity of the output of the microphone and means responsive to the charge on one of the condensers for disabling the charging circuit of the other condenser.

4. The combination, according to claim 3, in which the disabling means comprises oppositely poled triode rectifiers in the charging circuits and a grid-cathode connection for each rectifier including a resistor in shunt to the condenser of the other circuit.

5. In a system for locating the source of an explosion wave, the combination with two directional microphone units of the cosine type having their axes of sensitivity disposed in quadrature, an indicator and two transmission channels connecting the microphone units to the indicator, of two circuits in each channel having very short time constants, means for charging the circuits selectively according to the electrical polarity of the output of the associated microphone unit, means for generating prolonged pulses corresponding to the charges in the circuits, and means in each channel for actuating the indicator in accordance with the prolonged pulses.

6. In a system for locating the source of an explosion wave comprising two directional microphones having their axes of sensitivity disposed in quadrature, a cathode ray tube having two pairs of plates for deflecting a cathode ray in cartesian coordinates, balanced transmission channels connecting the microphones to the pairs of plates, means in each channel for producing a short, high voltage pulse in accordance with the response of the associated microphone to the first pulse of an explosion wave, means for prolonging the high voltage pulses and means for unbalancing the channels to actuate the cathode ray tube in accordance with the prolonged pulses.

7. A system according to claim 6 in which the short high voltage pulse in each channel momentarily disables the channel to prevent the actuation of the tube from being affected by the second pulse of the wave.

WILLIAM R. HARRY.